United States Patent [19]

Mecca

[11] Patent Number: 4,829,767
[45] Date of Patent: May 16, 1989

[54] POSITIONING DEVICE

[76] Inventor: John Mecca, 110 Whittier Dr., San Remo, N.Y. 11754

[21] Appl. No.: 190,777

[22] Filed: May 6, 1988

Related U.S. Application Data

[63] Continuation-in-part of Ser. No. 918,334, Oct. 15, 1986, Pat. No. 4,742,680.

[51] Int. Cl.$^4$ ................................................ F03G 7/06
[52] U.S. Cl. ........................................ 60/528; 60/527
[58] Field of Search .......................... 60/527, 528, 529

[56] References Cited

U.S. PATENT DOCUMENTS

| | | | |
|---|---|---|---|
| 3,940,935 | 3/1976 | Richardson et al. | 60/528 |
| 4,463,560 | 8/1984 | Greenleaf et al. | 60/528 X |
| 4,553,393 | 11/1985 | Ruoff | 60/528 |

Primary Examiner—Stephen F. Husar

[57] ABSTRACT

Apparatus for the control of a mounting table and the like utilizing wires made of temperature responsive material such as nitinol to position the table. Current flow through the wires cause the movement of the table which is mounted to permit tilting in any direction and rotation as well. Some of the wires are diagonally arranged to effect the rotation of the table.

4 Claims, 2 Drawing Sheets

POSITIONING DEVICE

This application is a continuation-in-part of Ser. No. 918,334 filed Oct. 15, 1986, now U.S. Pat. No. 4,742,680.

TECHNICAL FIELD

Relates to the control of movements of mounting tables and the like, for use in targeting missiles, aircraft, and positioning of robotic appendages.

BACKGROUND OF INVENTION

Numerous proposals for positioning targeting tables have been developed using electromagnetic field to change table positions, and spring loaded teeth upon gear teeth to eliminate slack in mechanical drive trains.

A need to target distant moving objects, and those within immediate proximity such as artificial limbs are considered imperative to use such methods where the drive train has no moving parts, and hence no play between driving mechanism and driven mounting plate.

Accordingly there exists a need to combine rigid direct motion with rapidity in change of attitude of mounting plate repeatedly. The device of the present invention fulfills these foregoing objectives.

SUMMARY OF THE INVENTION

The present invention takes advantage of the qualities of nitinol alloy wire stretched near the limit of its breakdown; and has the two ends of its length attached one end to the base of a cylinders rim edge, the other end of its length is attached to a disk with a hole in its center within which the convex end of the cylinder protrudes so as to allow the disk to pivot upon the convex lip end of the cylinder. Whereupon the plutrality of wires stretched longitudinally around has cylinder, each wire termination being fastened with an insulator to prevent wire contact to the cylinder and disk so forming individual conductors, are then connected to individual rheostats ultimately controlled by computer coupled microwarve radar. Each wire's rheostat input voltage correlates with target position integrated from computer coordination thereby causing resistive contraction in length of particular wires in concert with all other wire inputs thus causing divergence of the disk mounting plate appropriately. The nitinol alloy which returns to original length when heated and associated mechanism of mounting plate ideally is within an enclosure partially evacuated with residual appropriate gas mixture combinations to cause efficient dissipation of heat from wire into gas molecules moving within the partial vacuum, or liquids to conduct heat away.

It is therefore an object of the present invention to eliminate freeplay slack from the drive train of movable targeting tables.

It is another object to directly correlate position into linear corresponding resistance.

The novel features which are believed to be characteristic of the invention, both to its organization and method of facilitating targeting together with further objectives and advantages thereof will be better understood from the following description considered in connection with the accompanying drawings in which presently preferred embodiments of the invention are illustrated by way of example. It is to be expressly understood that the drawings are for the purpose of illustration and description only, and are not intended as a definition of the limits of the invention.

BRIEF DESCRIPTION OF THE INVENTION

DETAILED DESCRIPTION OF THE PRESENTLY PREFERRED EMBODIMENT

Figure 1:
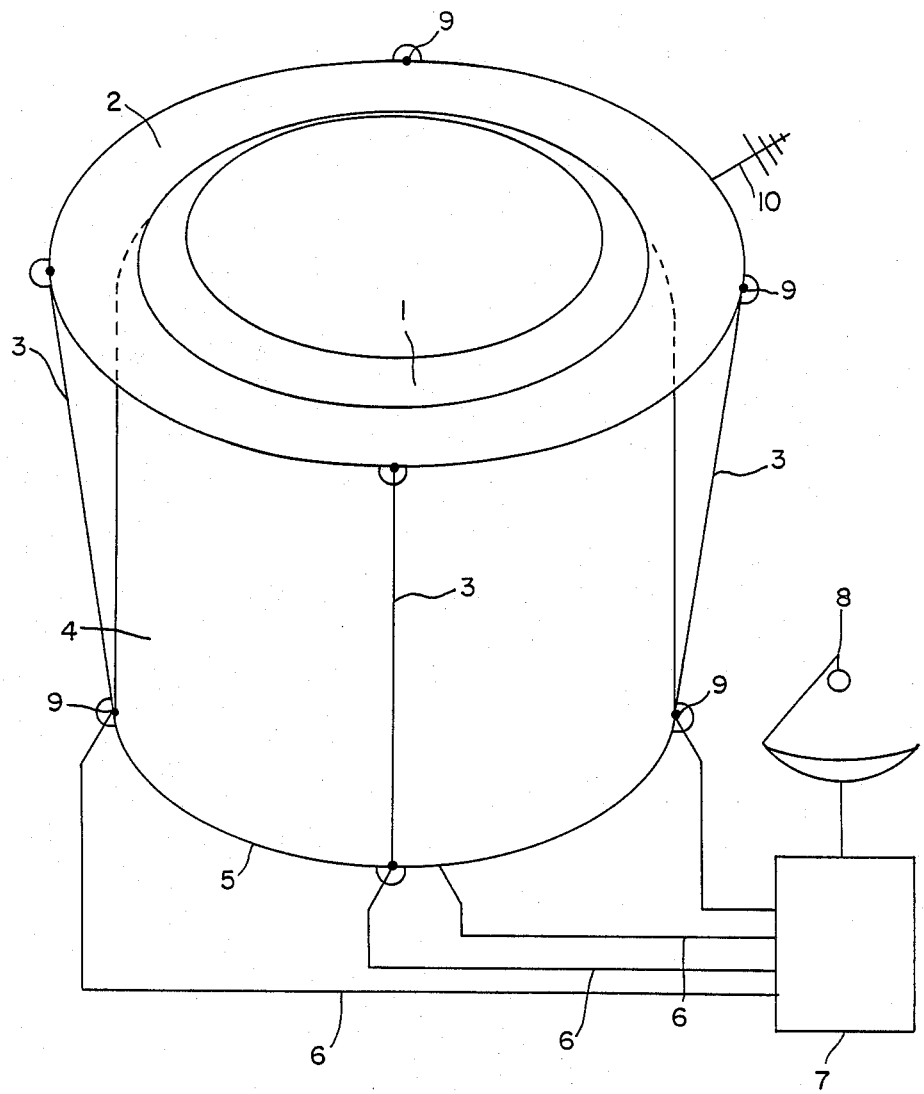
FIG. 1 is an illustration of a device embodying the present invention from a side perspective view showing the stationary cylinder and movable pivot disk with plurality of stretched nitinol wires arranged longitudinally between the disks outer edge and the end of the cylinder; and the termination of all wires connected to the rheostat controller radar computer.

While this invention is susceptible of embodiment in many different forms, there are shown in the drawing and will be described in detail, preferred embodiment of the invention. It should be understood, however, that the present disclosure is considered as an exemplification of the principles of the invention and is not intended to limit the invention to the embodiments illustrated.

The precise shape and sizes of the components described are not essential to the invention unless otherwise indicated. The apparatus of this invention may utilize certain conventional cable tension control mechanisms, the details of which will be apparent to those having skill in the art and an understanding of the necessary functions of such mechinisms.

FIG. 1 shows stationary cylinder 4 with disk 2 sitting upon it, and convex end 1 protruding through it as its pivot; stretched nitinol wires 3 are connected to insulator points 9 at the edge of disk 2 and the end of cylinder lip 5. Individual rheostat connections from computer are 6, and 10 represents the common ground lead for connections 6 to computer voltage controller 7 and microwave sensing mechanisms 8.

Figure 2:
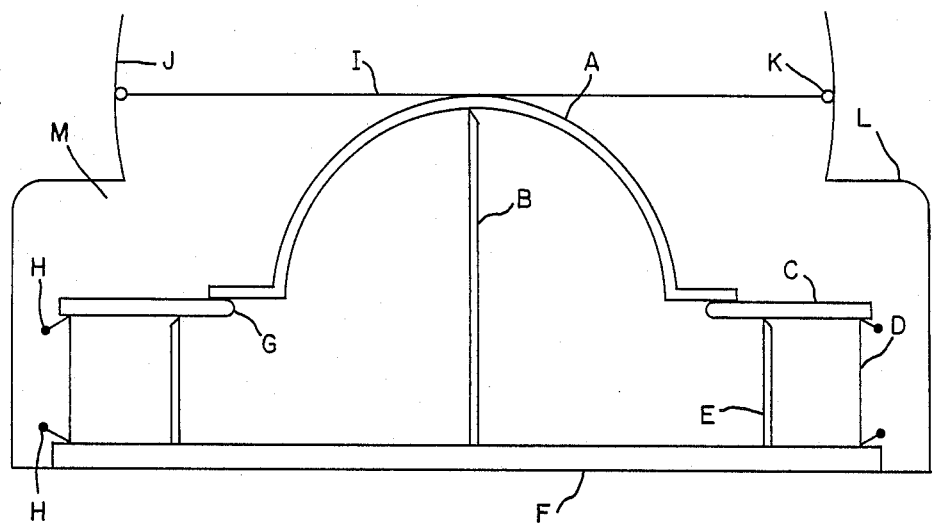
FIG. 2 shows an alterative embodiment with levers between the nitinol wire end and the movable table disk edge.

FIG. 2 shows a side cutaway view where a base for mounting the device is letter F and a centrl pivot B holds up movable mounting plate A, flanking each side are fulcrums C with their pivots E; letter G details point of intersection where fulcrums leverage is communicated to movable table A, nitinol wired D actuate the movement of the fulcrum to multiply the force upon the movable table A,. connection leads H ultimately lead to individual rheostats resistive heating for contraction and alternate relaxation of wire length. Table I is stationarily attached to table A that they may move together as one; radius J serves as a seat upon which O-ring K travels upon. O-ring K is a direct extension of the perimeter of table I in serving as a vacuum seal to container L to retain the partial vacuum within it labeled M.

Figure 3:
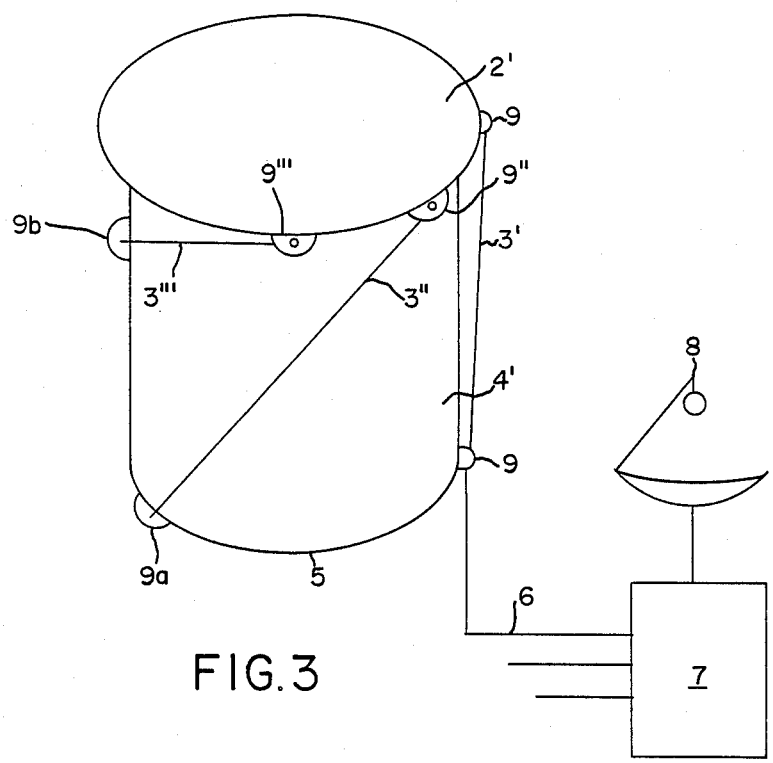
FIG. 3 shows the alternative embodiment with provision to rotate the pivot disk.

In the embodiment of FIG. 3, disk 2' is mounted on stationary cylinder 4' with a cylinder lip 5' as in FIG. 1 and may be provided with a plurality of stretched nitinol wires 3' as in the arrangement of FIG. 1. (The convex upper end of cylinder is not shown for convenience). In addition, cylinder 4' may be provided with a plurality of diagonal strands 3" and 3''' of nitinol or similar material attached at one end to points 9" and 9''', respectively, on the edge of disk 2'. The other ends of strands would be attached to points 9a and 9b to the main body of cylinder 4'. Not shown, are oppositely oriented diagonally extending strands on the other side of cylinder 4' to balance the effect of the strands shown. By controlling current flow through diagonally extending strands 3" and 3'" it is possible to simultaneously control rotation of disk 2' as well as tilting accomplished by strands 3'.

The apparatus shown in FIG. 3 is provided with the same source of electrical power and controller 7 and lead lines 6 as shown in FIG. 1 and sensing mechanism 8.

From the description above it is apparent that there has been provided simple apparatus for the remote control of a platform in all directions, that is, tilting and rotation.

What is claimed is:

1. A positioning apparatus comprising:
   a. a cylinder;
   b. a disk pivotably supported at one end of the cylinder;
   c. a plurality of nitinol wires attached about the circumferential edge of the disk and some of which are extending and attached to the cylinder at the end opposite of the disk and some of which are diagonally extending across the outside surface of said cylinder;
   d. a source of electric current associated with each wire;
   e. whereby selective activation of electric current to each wire causes said wires to expand and contract in a predetermined manner to cause said disk to pivot and rotate in a predetermined manner to thereby orient said disk to a predetermined position.

2. The positioning apparatus of claim 1 in which the end of said cylinder on which said disk is supported is convex, said disk being pivoted on and about the convex end of said cylinder.

3. The positioning apparatus of claim 2 in which said disk has an opening, the convex end of said cylinder protruding through said opening.

4. Positioning apparatus comprising:
   a. stationary cylindrical means for pivotably support means to be positioned, said means to be positioned is a disk mounted on one end of said cylindrical means;
   b. means comprising a plurality of extended wires formed of temperature—responsive material some of which are distributed circumferentially about said stationary means connected between one end of said stationary means and said means to be positioned and others of which are diagonally extending across the outside surface of said cylinder; and
   c. means for selectively adjusting the temperature of each of said wires causing said wires to expand and contract in a predetermined manner to control tilting and rotation of said means to be positioned.

* * * * *